US 006996809B2

(12) United States Patent
Muhlestein et al.

(10) Patent No.: US 6,996,809 B2
(45) Date of Patent: Feb. 7, 2006

(54) METHOD AND APPARATUS FOR PROVIDING INSTRUMENTATION DATA TO AN INSTRUMENTATION DATA SOURCE FROM WITHIN A MANAGED CODE ENVIRONMENT

(75) Inventors: Travis J. Muhlestein, Redmond, WA (US); Corina E. Feuerstein, Redmond, WA (US); Jeffrey M. Cooperstein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 09/899,959

(22) Filed: Jul. 6, 2001

(65) Prior Publication Data

US 2002/0004815 A1    Jan. 10, 2002

Related U.S. Application Data

(60) Provisional application No. 60/217,123, filed on Jul. 10, 2000.

(51) Int. Cl.
G06F 9/44         (2006.01)
(52) U.S. Cl. ............ 717/130; 717/121; 717/122; 717/136
(58) Field of Classification Search ........ 717/130–148, 717/162–167, 120–123; 709/310–317
See application file for complete search history.

(56) References Cited

U.S. PATENT DOCUMENTS 6,119,130 A * 9/2000 Nguyen et al. ............ 707/203
6,226,792 B1 * 5/2001 Goiffon et al. ............ 717/120
6,262,587 B1 * 7/2001 Whetsel ..................... 324/765
6,721,941 B1 * 4/2004 Morshed et al. ........... 717/127
6,754,664 B1 * 6/2004 Bush ......................... 707/102
6,871,346 B1 * 3/2005 Kumbalimutt et al. ..... 718/104
2002/0019971 A1 * 2/2002 Zygmont et al.

OTHER PUBLICATIONS

Festor, O., et al., "Integration of WBEM-Based Management Agents in the OSI Framework," *Integrated Network Management VI, Distributed Management for the Networked Millennium, Proceedings of the Sixth IFIP/IEEE International Symposium on Integrated Network Management*, 1999, pp. 49-64.

Hariri, S., et al., "Design and Analysis of a Proactive Application Management System (PAMS)," *Proceedings of Network Operations and Management Symposium 'The Networked Planet: Management Beyond 2000'*, 2000, pp. 89-101.

John, A., et al., "XNAMI—An eXtensible XML-Based Paradigm for Network and Application Management Instrumentation," *IEEE International Conference on Networks, ICON '99 Proceedings*, 1999, pp. 115-124.

(Continued)

*Primary Examiner*—Tuan Dam
*Assistant Examiner*—Chuck Kendall
(74) *Attorney, Agent, or Firm*—Christensen O'Connor Johnson Kindness PLLC

(57) ABSTRACT

A method and apparatus for providing instrumentation data to an instrumentation data source from within a managed code environment is provided. A decoupled provider is provided that executes partially in managed code and partially in unmanaged code. The decoupled provider facilitates communication with an instrumentation data source. The decoupled provider also dynamically registers schema for managed code objects to be instrumented at run-time. The decoupled provider also receives and processes requests from the instrumentation data source to retrieve instance data for managed code objects, to write properties on managed code objects, and to execute methods on managed code objects.

33 Claims, 8 Drawing Sheets

OTHER PUBLICATIONS

Johnson, L.J., "Manage Resources With WMI: Learn how to Manage Computer Resources on all Windows Platfoms with WMI.," *Visual Basic Programmers' Journal*, vol. 10, No. 8, Jul. 2000, pp. 44-53.

Kar, G., et al., "Managing Application Services over Service Provider Networks: Architecture and Dependency Analysis," *Proceedings of Network Operations and Management Symposium 'The Networked Planet: Management Beyond 2000'*, 2000, pp. 61-74.

Katchabaw, M.J., et al., "Making Distributed Applications Manageable Through Instrumentation," *The Journal of Systems and Software*, vol. 45, No. 2, Mar. 1, 1999, pp. 81-97.

Kawamura, R., et al., "A Middleware Architecture for Active Distributed Management of IP Networks," *Proceedings of Network Operations and Management Symposium 'The Networked Planet: Management Beyond 2000'*, 2000, pp. 291-304.

McConnell, J., "DMTF: A Foundation for Systems Management?", *ConneXions*, vol. 8, No. 9, Sep. 1994, pp. 22-27.

Ohara, Y., et al., "Management and Communication Protocol Specifications," *NTT Research and Development Journal*, vol. 44, No. 11, 1995, pp. 1089-1098.

Thompson, J.P., "Web-Based Enterprise Management Architecture," *IEEE Communications Magazine*, vol. 36, No. 3, Mar. 1998, pp. 80-86.

Vidal, M.E., et al., "A Meta-Wrapper for Scaling up to Multiple Autonomous Distributed Information Sources," *Proceedings, Third IFCIS International Conference on Cooperative Information Systems*, 1998, pp. 148-157.

Yamagishi, K., et al., "An Implementation of a TMN-Based SDH Management System in Japan," *IEEE Communications Magazine*, vol. 33, No. 3, Mar. 1995, pp. 80-85.

* cited by examiner

METHOD AND APPARATUS FOR PROVIDING INSTRUMENTATION DATA TO AN INSTRUMENTATION DATA SOURCE FROM WITHIN A MANAGED CODE ENVIRONMENT

CROSS-REFERENCE TO RELATED APPLICATIONS

This application claims the benefit of U.S. Provisional Application No. 60/217,123, filed Jul. 10, 2000, which is expressly incorporated herein by reference.

FIELD OF THE INVENTION

This invention generally relates to the field of computer systems management and, more specifically, relates to a method and apparatus for providing computer systems management instrumentation data available within a managed code runtime environment to an instrumentation data source executing outside the managed code environment.

BACKGROUND OF THE INVENTION

A wide array of products and services are accessible through the Internet and the World Wide Web ("Web" or "WWW"). For example, a Web user can shop, get traffic conditions, read product reviews, and compare products on-line. However, there are many types of services that are still not available through the Web. While a Web user may be able to find a restaurant in their particular area, for instance, they may be unable to determine whether that restaurant has seating available at a particular time on a particular night. Likewise, if a user owns a business, they may be interested in knowing if a vendor has a particular item in stock. If more than one vendor has the item in stock, the business owner may be interested in knowing which vendor has the item for the lowest price and which one can deliver the item fastest. Users are unable to perform such tasks using services currently available on the Web.

Services like those described above do not yet exist because there are no standards in place for integrating proprietary information like available restaurant seating, vendor inventory, prices, and delivery times, and other such information. After all, each vendor most likely has a unique way of describing the items or products they sell. Moreover, it is very difficult to develop computer program code necessary for integrating such disparate data and services. However, emerging technologies, such as the extensible markup language ("XML"), make the task of describing disparate types of data in a consistent way much easier. Moreover, new application development and execution platforms can help developers create and deploy distributed applications quicker and easier than ever before.

One development and execution platform that helps software developers to create and deploy distributed applications is the Microsoft®.NET platform from Microsoft® Corporation of Redmond, Washington. The Microsoft®.NET platform is an application programming and execution platform that provides write-once, compile-once, run-anywhere application development. Microsoft®.NET platform applications may be created in any language as long as they are compiled by a compiler that targets the Microsoft®.NET universal runtime ("URT"), also known as the common language runtime engine. Such a compiler compiles .NET applications into intermediate language ("IL"), rather than directly into executable code. IL is a platform-independent and central processing unit ("CPU")-independent intermediate language. IL is a much higher level language than most CPU machine languages.

To execute a .NET platform application, the compiled IL is interpreted, or "just-in-time" compiled, by the URT into native machine instructions. The native machine instructions can then be directly executed by the CPU. Because IL is CPU-independent, IL can execute on any CPU platform as long as the operating system running on that CPU platform hosts the Microsoft®.NET URT. Applications compiled into IL need the URT to execute, and are called "managed code" applications. By contrast, code that does not need the common language runtime to execute, such as today's Win32 applications, are called "native code" applications.

The Microsoft®.NET platform also includes a base library that comprises a large set of class libraries and services. These libraries and services provide access to the features of the URT, and other high-level services, so that software developers do not have to code the same services repeatedly. For instance, classes may be offered to expose hypertext transfer protocol ("HTTP") clients and servers, generic containers like arrays and dictionaries, and other types of classes previously available only through language-specific extensions.

The Microsoft®.NET platform also provides technologies to support rapid software development. For instance, in the Microsoft®.NET platform, all application services are offered via a common object-oriented programming model. This is unlike previous development and execution environments where some operating system facilities are accessed via dynamically linked library ("DLL") functions and other facilities are accessed via component object model ("COM") objects. Moreover, the Microsoft®.NET platform provides consistency in error-handling. When programming Microsoft® Windows® in a traditional fashion, some functions report Win32 error codes, some return HRESULTS, and some raise exceptions. In the Microsoft®.NET platform, all errors are reported via exceptions. This greatly simplifies reading, writing, and maintaining code.

In order to access management information about other applications and devices, Microsoft®.NET applications need access to instrumentation data, such as the data provided by Microsoft® Windows Management Instrumentation ("WMI"). WMI is the Microsoft® Corporation's implementation of the Distributed Management Task Force's ("DMTF") Web-Based Enterprise Management ("WBEM") initiative. WMI is a set of system services and programming interfaces that allow applications to expose instrumentation data in a consistent way. By exposing instrumentation data in a consistent fashion, management applications can be written to a single application programming interface ("API"). WMI also provides a set of services, such as remoting, asynchronous access, and scripting, that allow applications and management tools to better access and serve management data without requiring information providers to explicitly support those features. Additionally, WMI services also include a standard query language for management objects, event publication and subscription, and standard event filtering and aggregation.

WMI currently runs in native code outside the .NET platform. Therefore, WMI does not have access to instrumentation data offered by applications executing in managed code. Because WMI is a management platform, in order to be effective it must be able to access data regarding all instrumented objects and applications, including those executing in managed code within the .NET platform. Additionally, WMI should be able to easily obtain instance information on object classes exposed from within the .NET platform, and to write properties and execute methods on instances of these classes. In order to be truly effective, provision of instrumentation data from the .NET platform to WMI should be easily implemented during or after code development and deployment.

Therefore, in light of the above, there is a need for a method and system for easily providing instrumentation data, including class, instance, and method information, from applications executing within a managed code environment, such as the .NET platform, to an instrumentation data source, such as WMI. Moreover, provision of instrumentation data should be accomplished through an easy-to-use interface that allows code to be instrumented during or after development.

SUMMARY OF THE INVENTION

The present invention solves the above-described problems by providing an interface between instrumented data within a managed code environment, such as the .NET platform, and an instrumentation data source, such as WMI. The present invention allows event and instance information regarding instrumentation data to be easily provided to an instrumentation data source that resides outside a managed code environment. Moreover, the present invention allows methods to be invoked on instrumented data that resides within the managed code environment by an instrumentation data source executing outside the managed code environment. Additionally, the present invention provides writable properties on instances of classes exposed to the external instrumentation data source. The present invention easily allows objects to be instrumented through the use of a simple attribute. The attribute can advantageously be added during development of the instrumented application or even after deployment when no access to source code is provided.

More specifically described, the present invention provides an instrumentation API that acts as interface between code executing in managed code environment and an instrumentation data source, such as WMI. A portion of the API, the decoupled provider, executes within managed code and a portion of the API, the decoupled proxy, executes in native code. Together, these components interface with the instrumentation data source to provide access to data on managed code classes, instances, and events, to provide writable properties, and to allow events to be fired from managed code into the instrumentation data source.

In order to expose instances of objects within the managed code environment to the instrumentation data source, the instance simply needs to be marked with an "instrumented" attribute. When an instance of the object is created at run-time, the "instrumented" attribute is utilized to identify the object as one that should be instrumented. If such an object is found, a determination is made as to whether a decoupled provider has been loaded for communicating with the instrumentation data source. The decoupled provider acts as an intermediary between the managed code environment and the instrumentation data source. The decoupled provider is loaded if it has not been previously.

Once the decoupled provider is present, a determination is made as to whether schema describing the instrumented data has been previously registered with the instrumentation data source. If the schema has been previously registered with the instrumentation data source, an additional determination is made as to whether the registered schema is correct. The previously registered schema is overwritten if it is not correct. The schema is registered with the instrumentation data source if it has not been previously. Additionally, the managed code application associated with the data to be instrumented is also registered with the instrumentation data source as a provider of instrumentation data as described in the schema. The decoupled provider is also notified that instances of the object should be provided to the instrumentation data source when requested.

The decoupled provider may subsequently receive requests from the instrumentation data source for instances of the instrumentation data. When such a request is received at the decoupled provider, the decoupled provider may query provider code contained in managed code applications to identify instances matching the query. If instances satisfying the query are found, the decoupled provider converts the managed code properties for the instance into properties compatible with the instrumentation data source. The decoupled provider then passes the converted properties to the instrumentation data source.

The decoupled provider also receives and processes requests to write properties and execute methods on instances of managed code objects. If the decoupled provider receives a request to write a property or execute a method on a managed code object, the decoupled provider first identifies the proper object. The decoupled provider then calls the requested method on the object or writes the requested property. The decoupled provider then provides a confirmation to the instrumentation data source that the requested action can be taken. In this manner, an instrumentation data source, like WMI, can write properties and execute methods on objects exposed from within a managed code environment, like the .NET platform.

The present invention also provides functionality for firing events from within a managed code environment into an instrumentation data provider. In order to fire events from managed code, an object simply needs to be marked with an "event" attribute. A fire event method may then be called on the object to fire the event into the instrumentation data source. When the fire event method is executed, a determination is made as to whether an event class has previously been registered with the instrumentation data source that has the same name as the class of event to be fired. If an appropriate event class has not been registered with the instrumentation data source, the fire event method identifies the properties of the object, registers the object with the instrumentation data source, and also registers the application associated with the object as a provider of objects of that type. If a class corresponding to the object has been previously registered with the instrumentation data source, the fire event method determines whether the registered event class has identical properties as the object to be fired. If the properties are not identical, the fire event method overwrites the current registration in the instrumentation data source with the correct properties for the object to be fired.

Once the event class to be fired has been correctly registered with the instrumentation data source, the fire event method determines whether a decoupled provider has been loaded for the event class. The decoupled provider is loaded if it has not been previously, and the event class to be fired is identified to the decoupled provider. The decoupled provider then communicates with the instrumentation data source to determine whether any client applications are "listening" for events of the class type. If no client applications are listening, or if a client is listening for event types that do not match the event type to be fired, the decoupled provider does not fire the event into the instrumentation data source. If a client is listening, the decoupled provider converts the event properties from managed code properties to a format compatible with the instrumentation data source and passes the event to the instrumentation data source.

The present invention also provides a system, computer-controlled apparatus, and a computer-readable medium for providing instrumentation data to an instrumentation data source from within a managed code environment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The present invention is directed to a method, computer-readable media, and apparatus for providing instrumentation data from a managed code environment to an instrumentation data provider. Aspects of the present invention may be embodied in a managed code development and runtime environment, or through and API exposed within the managed code environment. Additionally, aspects of the present invention may be embodied in an operating system program, such as Windows® 2000, provided by Microsoft® Corporation of Redmond, Wash.

Referring now to the figures, in which like numerals represent like elements, an actual embodiment of the present invention will be described. Although aspects of the invention will be described in the general context of a managed code environment that includes program modules that execute on an operating system in conjunction with a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. Although the invention is also described as being practiced in a distributed computing environment, where tasks are performed by remote processing devices that are linked through a communications network, other possible implementations should be apparent to those skilled in the art.

Figure 1:
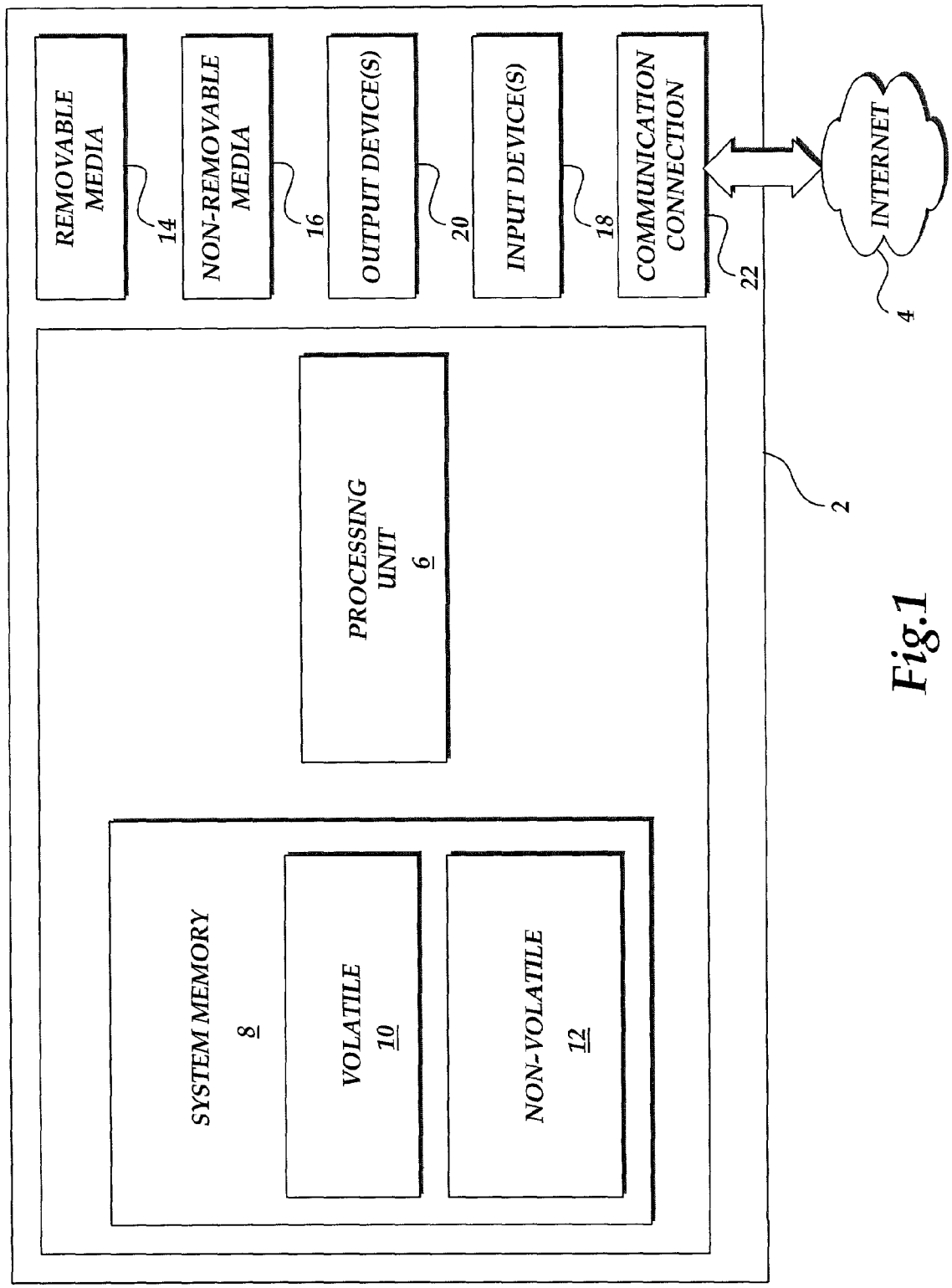
FIG. 1 is a block diagram showing a computer that is an illustrative operating environment for an actual embodiment of the present invention.

Referring now to FIG. 1, an illustrative operating environment for an embodiment of the present invention will be described. Aspects of the present invention are implemented as an executable software component executing on a computer, such as the computer 2, accessible via a distributed computing network, such as the Internet 4. As is well known to those skilled in the art, the Internet 4 comprises a collection of networks and routers that use the Transmission Control Protocol/Internet Protocol ("TCP/IP") to communicate with one another. The Internet 4 typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, Mbps digital T-1 lines, 45 Mbps T-3 lines or other communications links known to those skilled in the art. Furthermore, computers, such as the computer 2, and other related electronic devices can be remotely connected to either the LANs or the WANs via a permanent network connection or via a modem and temporary telephone link. It should be appreciated that the Internet 4 comprises a vast number of such interconnected networks, computers, and routers.

The computer 2 comprises a general purpose computer as known to those skilled in the art, including a processing unit 6, a system memory 8, and a system bus (not shown) that couples the system memory 8 to the processing unit 6. The computer 2 also typically includes at least some form of computer-readable media. Computer-readable media can be any available media that can be accessed by the computer 2. By way of example, and not limitation, computer-readable media may comprise computer storage media and communication media. Computer storage media includes volatile media 10 and nonvolatile media 12, removable 14 and non-removable media 16 implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by the computer 2.

As known to those skilled in the art, the system memory 8 may include a ROM and a RAM (not shown). A basic input/output system ("BIOS"), containing the basic routines that help to transfer information between elements within the computer 2, such as during start-up, may also be provided. A number of program modules may be stored in the computer storage media, including an operating system suitable for controlling the operation of the computer 2, such as Windows NT® or Windows® 2000 from Microsoft®. As will be described in more detail below, the system memory 8 may also store a managed code environment, including a common language runtime, and instrumentation provider code for exposing instrumentation data available within the managed code environment to an instrumentation data source executing outside the managed code environment.

A user may control the operation of the computer 2 through input devices 18 such as a keyboard or a mouse (not shown). These and other input devices are often connected to the processing unit 6 through a serial port interface (not shown) that is coupled to the system bus, but may be connected by other interfaces, such as a universal serial bus ("USB"). Output devices 20, such as a monitor (not shown), are also connected to the system bus via an interface, such as a video adapter (not shown). In addition to the monitor, the computer 2 may include other output devices 20, such as a printer (not shown).

As described briefly above, the computer 2 operates in a networked environment in the actual embodiment of the invention described herein. The computer 2 communicates with other computers over the Internet 4 and connects to the Internet 4 through a network interface. Alternatively, the computer 2 may include a modem (not shown) and use an Internet Service Provider ("ISP") to establish a connection to the Internet 4. It will be appreciated that the network connections described herein are illustrative and other means of establishing a communications link between the computer 2 and the Internet 4 may be used.

Figure 2:
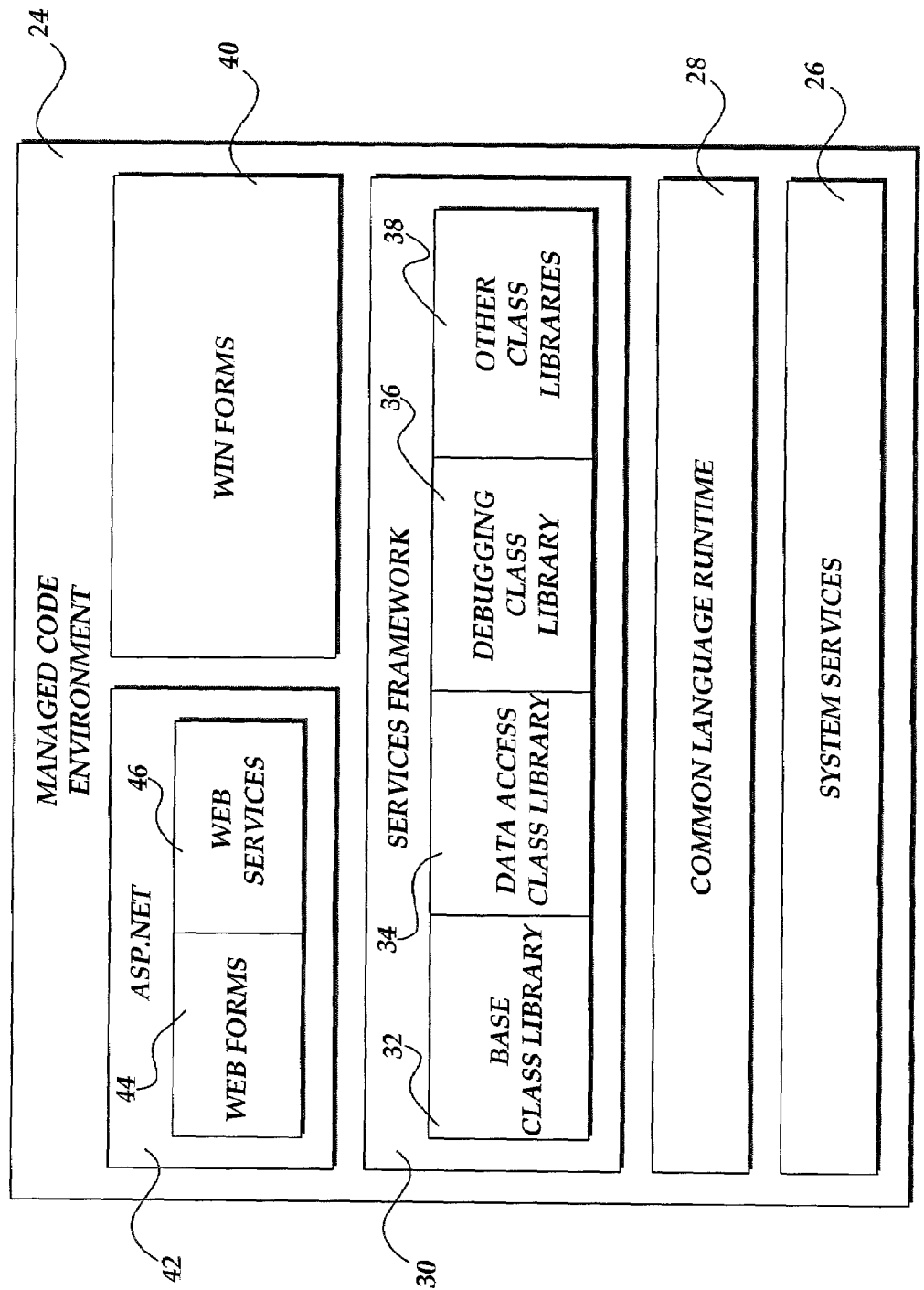
FIG. 2 is a block diagram showing a managed code environment, including a common language runtime, utilized in the actual embodiment of the present invention described herein.

Referring now to FIG. 2, an illustrative managed code environment 24 will be described. As mentioned briefly above, the managed code environment 24 comprises an application development and execution environment that provides facilities to make the development and execution of distributed applications and services much easier. In the actual embodiment of the present invention described herein, the managed code environment 24 comprises the Microsoft®.NET platform, which will be described in detail below. Those skilled in the art should appreciate that while the present invention is described herein as executing on the Microsoft®.NET framework, the present invention may also be utilized in connection with other types of managed code environments that utilize an interpreter, or "just-in-time" compiler to execute applications. For instance, the present invention may be utilized in connection with a Java® virtual machine from Sun Microsystems.

According to the actual embodiment of the present invention described herein, the managed code environment 24 comprises operating system services 26, a common language runtime 28, a services framework 30, and one or more application models, such as the active server pages plus ("ASP.NET") application model 42 and the Win forms application model 40. Each of the components of the managed code environment 24 is described in detail below.

At the lowest level of the managed code environment 24 resides operating system services 26. As known to those skilled in the art, an operating system may provide a number of services such as memory management and hardware support through device drivers, and other types of services. These operating system services 26 are exposed to the managed code environment 24 through APIs, DLLs, or through other means known to those skilled in the art.

Built on top of the operating system services 26 is a common language runtime ("runtime") 28 that loads and executes code written in any runtime-aware programming language. Code that targets the runtime 28 is called managed code. Managed code means that there is a defined contract of operation between executing code and the runtime 28. Responsibility for tasks like creating objects, making method calls, and so on is delegated to the runtime 28, which enables the runtime 28 to provide additional services to the executing code.

The runtime 28 makes use of a common type system capable of expressing the semantics of most modern programming languages. The common type system defines a standard set of types and rules for creating new types. The runtime 28 understands how to create and execute these types. Compilers and interpreters use runtime 28 services to define types, manage objects, and make method calls instead of using tool- or language-specific methods.

A primary design goal for the type system of the runtime 28 is to enable deep multi-language integration. Using the runtime 28, code written in one language can inherit implementation from classes written in another language; exceptions can be thrown from code written in one language and caught by code written in another; and operations such as debugging and profiling work seamlessly regardless of the language used to write the code. The means that developers of reusable class libraries no longer need to create versions for each programming language or compiler, and developers using class libraries are no longer limited to libraries for the programming language they are using.

The runtime 28 also supplies integrated, pervasive security services to ensure that unauthorized users cannot access resources on a machine and that code cannot perform unauthorized actions. This improves overall system safety and reliability. Since the runtime 28 is used to load code, create objects, and make method calls, the runtime 28 can perform security checks and enforce security policy as managed code is loaded and executed. In this regard, the runtime 28 supports code access security and role-access security.

With code access security, developers can specify the required permissions their code requires. For example, code may need permission to write a file or access environment variables. At load time and on method calls, the runtime 28 verifies that the code can be granted the permissions it has asked for. If not, a security violation is reported.

Role-based security builds on the same permissions model as code access security, except that the permissions are based on user identity rather than code identity. Roles represent categories of users and can be defined at development or deployment time. Policies for granting permissions are assigned to each defined role. At run time, the identity of the user on whose behalf the code is running is determined. The runtime 28 determines what roles the user is a member of and then grants permissions based on those roles.

A services framework 30 resides on top of the runtime 28. The services framework 30 provides classes that can be called from any modem programming language. In particular, the services framework 30 includes a base class library 32, a data access class library 34, and a debugging class library 36. The base class library 32 includes a set of class libraries that developers would expect in a standard language library, such as collections, input/output, string, and numerical classes. In addition, the base class library 32 provides classes to access operating system services 26, such as graphics, networking, threading, globalization, and cryptography. The data access class library 34 provides classes for connecting to, issuing commands against, and retrieving results from data stores. Other class libraries 38 may also be provided. It should also be appreciated that each of these class libraries complies with a set of naming and design guidelines to further reduce the learning curve for developers.

Conceptually, on top of the services framework 30, sit two application models: the ASP.NET application model 42 and the Win forms application model 40. Developers writing client applications for the Microsoft Windows® operating system can use the Win forms application model 40 to take advantage of the rich user interface features of the Windows® operating system, including existing ActiveX controls and features of the Windows® 2000 operating system, such as transparent, layered, and floating windows.

The ASP.NET application model 42 takes advantage of the common language runtime 28 and the services framework 30 to provide a reliable, robust, scalable hosting environment for distributed applications. To provide such functionality, the ASP.NET application model 42 includes forms 44 that are responsible for generating a user interface, typically in the form of hyper-text markup language ("HTML"). The ASP.NET application model 42 comes with a set of Web forms 44 that mirror typical HTML user interface widgets (including list boxes, text boxes, and buttons), and an additional set of Web controls that are more complex (such as calendars and advertising rotators). The ASP.NET application model also includes Web services 46 that provide a high-level programming model for building Web services with ASP.NET.

Figure 3:
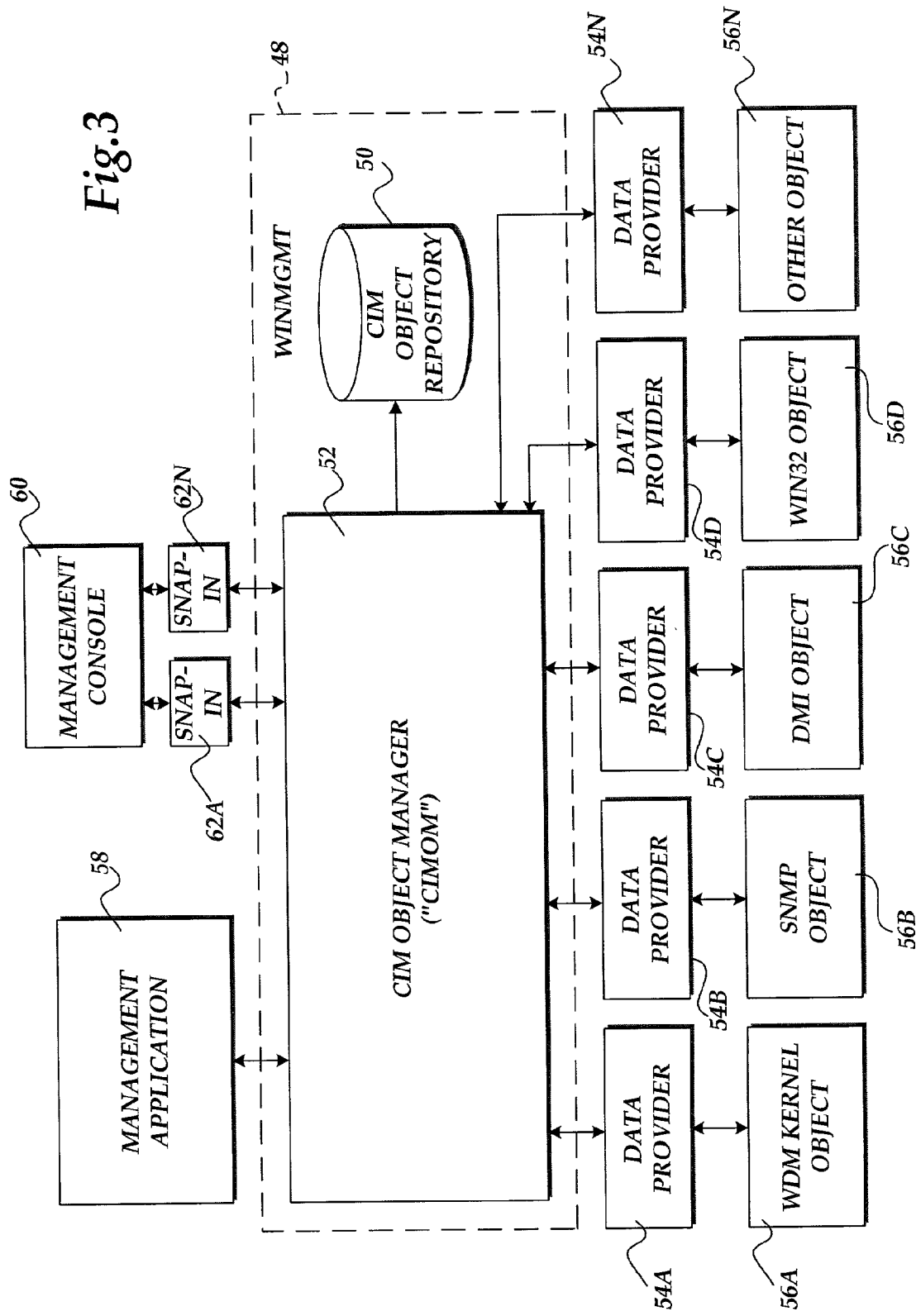
FIG. 3 is a block diagram showing an illustrative management instrumentation data source utilized in an actual embodiment of the present invention.

Referring now to FIG. 3, an illustrative management instrumentation data source will be described. As mentioned briefly above, aspects of the present invention provide access to instrumentation data contained within a managed code runtime environment, such as the Microsoft®.NET platform, to a management instrumentation data source. In the actual embodiment of the present invention described herein, the management instrumentation data source is Microsoft® Windows Management Instrumentation.

As mentioned briefly above, WMI is the Microsoft® Corporation's implementation of the Desktop Management Task Force's Web-Based Enterprise Management initiative. As known to those skilled in the art, WMI is a set of system services and programming interfaces that allow applications to expose instrumentation data in a consistent way. By exposing instrumentation data in a consistent fashion, management applications can be written to a single API.

WMI also provides a set of services, such as remoting, asynchronous access, and scripting, that allow applications and management tools to better access and serve management data without requiring information providers to explicitly support those features. It should be appreciated by those skilled in the art that while the actual embodiment of the present invention described herein provides access to instrumentation data contained within a managed code environment to WMI, the present invention may also be practiced with other types of instrumentation data sources, including other implementations of WBEM.

In WMI, a service, WINMGMT 48, provides all of the WMI functionality. According to an actual embodiment of the present invention, the WINMGMT 48 service is implemented as a single executable process, in concert with several in-process DLLs that assist the executable process in areas such as delivering or filtering events. In accordance with another actual embodiment of the present invention, the WINMGMT 48 service is hosted in-process to another executable. This WINMGMT 48 service supports a Common Information Model ("CIM") object repository 50 that provides a central storage area for management data, a CIM object manager 52 ("CIMOM") that provides applications with uniform access to management data, and the APIs that together deliver WMI. Applications depend on the CIMOM 52 to handle the interface between a management application 58 and data providers 54A–54N. WMI facilitates these communications by supporting a common programming interface, the Component Object Model ("COM") interface. The WMI COM API supplies event notification and query processing services and can be used in several programming language environments, such as 'C' and 'C++'.

The CIM repository 50 holds the CIM and associated schema, along with data information or data source details. The CIMOM 52 uses the schema data contained in the CIM repository 50 when servicing requests from a management application 58 for data regarding managed objects 56A–56N. A management application 58 is an application or operating system service that uses or processes information originating from managed objects 56A–56N. Through the use of the present invention, the management application 58 may obtain instance information, write properties, and execute methods on managed objects within a managed code environment. A management application 58 can access managed object information by making a requests to the CIMOM 52 through one of the methods provided in the WMI API. As known to those skilled in the art, the CIMOM 52 may also use the schema data in the CIM repository 50 when servicing requests from a management console 60 received through "snap-ins" 62A–62N.

The managed objects 56A–56N are either physical or logical enterprise components that are modeled using CIM. For example, a managed object can be hardware such as a cable, or software such as a database application. Managed objects 56A–56N may include a Windows Driver Model ("WDM") kernel object 56A, a Simple Network Management Protocol ("SNMP") object 56B, a Desktop Management Interface ("DMI") object 56C, a WIN32 object 56D, or other type of object 56N. As will be described in detail below, managed objects may also include objects resident in a managed code environment.

The CIMOM 52 communicates with the managed objects 56A–56N through the data providers 54A–54N. The data providers 54A–54N are standard COM and distributed COM ("DCOM") servers that function as mediators between the managed objects 56A–56N and the CIMOM 52. The data providers 54A–54N supply instrumentation data for parts of the CIM schema. If the CIMOM 52 receives a request from a management application 58 for data that is not available from the CIM object repository 50, or for event notifications that are not supported by the CIMOM, the CIMOM 52 forwards the request to the appropriate one of the data providers 54A–54N. The data providers 54A–54N can then supply data and event notifications for the specific managed object 56A–56N to the CIMOM 52. In turn, this data can be returned by the CIMOM 52 to the management application 58. As will be described below, a decoupled provider and decoupled proxy communicate to the CIMOM through a COM or DCOM interface and allow the provision of instrumentation data from a managed code environment.

Figure 4:
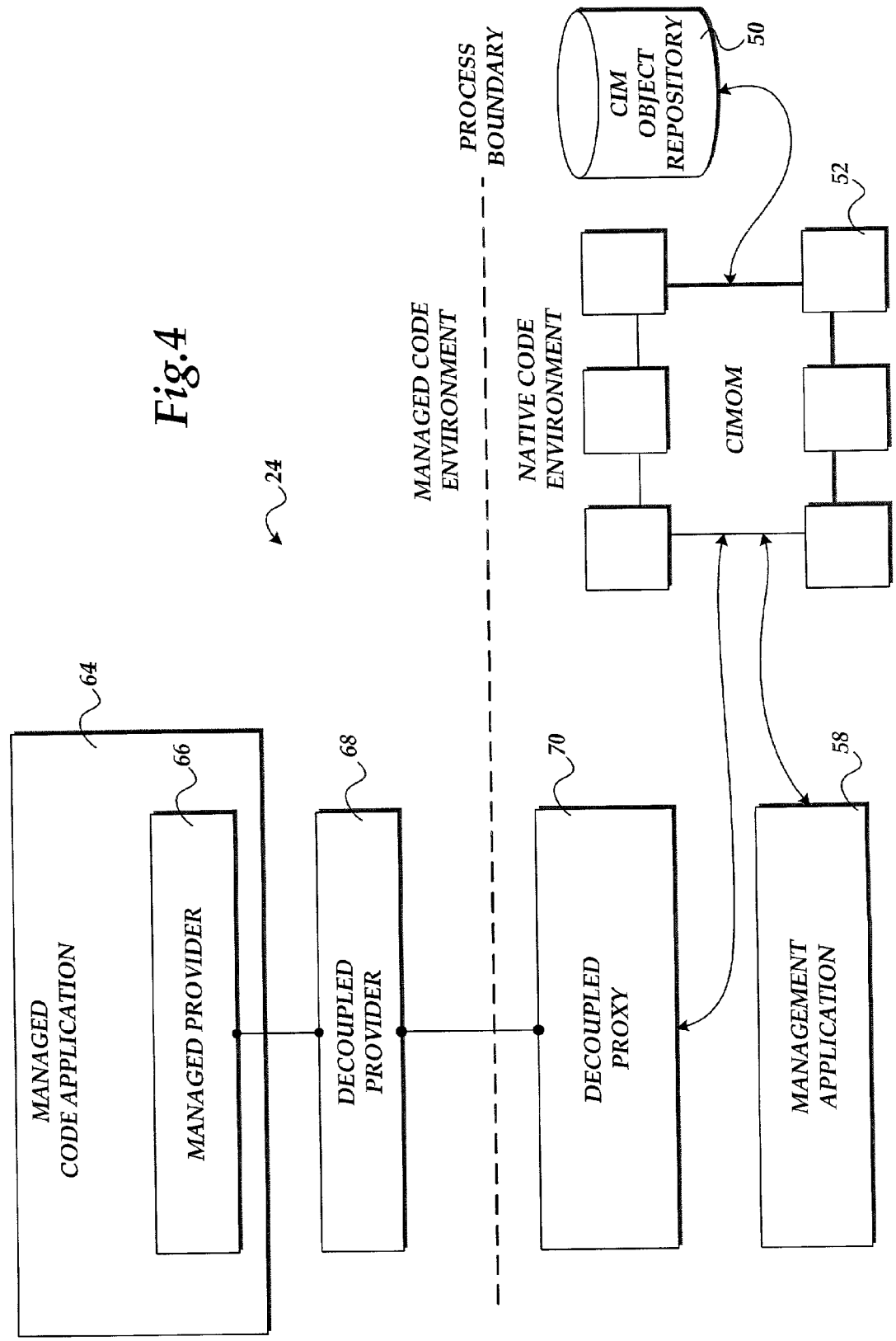
FIG. 4 is a block diagram showing an illustrative interface between a managed code environment and a management instrumentation data source executing within a native code environment.

Referring now to FIG. 4, an illustrative interface between a managed code environment 24 and an instrumentation data source, such as WMI, executing within a native code environment will be described. As described above, an instrumentation data source, such as WMI, executes within a native code environment, such as WIN32. In WMI, the CIMOM 52 receives requests from management applications regarding managed objects, such as objects exposed by the managed code application 64. In order to respond to such requests, the CIMOM 52 may query the CIM object repository 50, or may query a data provider associated with the particular managed object for which data is needed. For instance, the CIMOM 52 may query the WIN32 data provider 54F for instrumentation data regarding the managed object 56F. If the requested data relates to an object existing in the managed code environment 24, the CIMOM 52 may query a decoupled provider 68 executing in managed code. Once the requested instrumentation data is received, the CIMOM 52 can respond to the request from the management application 58.

In order to provide access to instrumented objects that exist within the managed code environment 24, the present invention provides a decoupled provider 68, a managed provider 66, and a decoupled proxy 70. As will be described in greater detail below, the decoupled provider 68 and the decoupled proxy 70 facilitate communication with the CIMOM 52. In particular, these objects assist the managed provider 66 in dynamically registering objects to be instrumented with the CIMOM 52, respond to requests from the CIMOM 52 for instance data, and also respond to requests to write properties or execute methods on instrumented objects.

Figure 5:
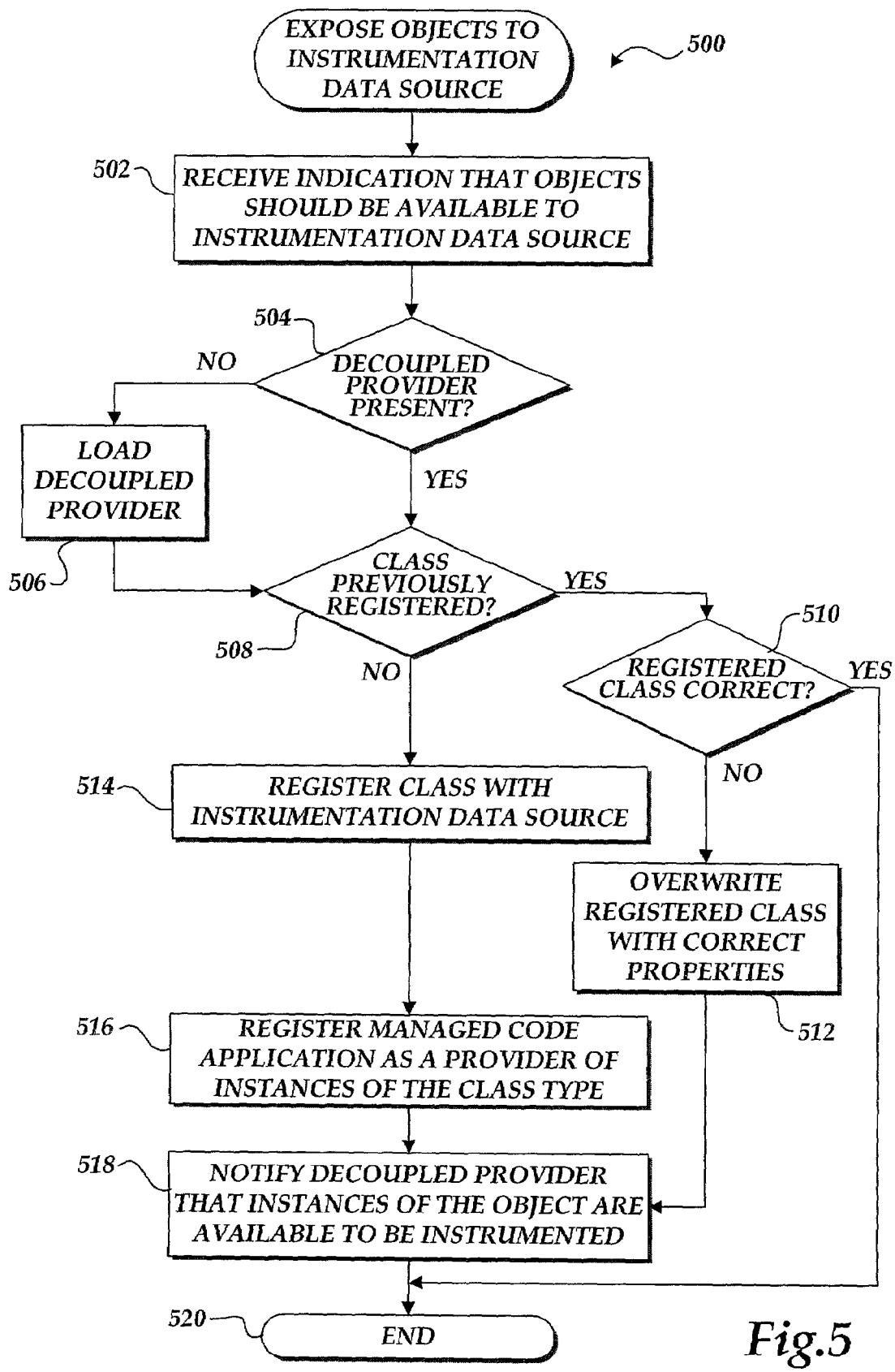
FIG. 5 is a flow diagram showing an illustrative routine for exposing managed code objects to an instrumentation data source according to an actual embodiment of the present invention.

Turning now to FIG. 5, an illustrative Routine 500 will be described for exposing objects to an instrumentation data source according to an actual embodiment of the present invention. According to the actual embodiment of the invention described herein, the Routine 500 is executed at run-time and provides functionality for dynamically registering instrumented objects with the instrumentation data source. In this manner, these objects can be made available to interested management applications, or clients. Those skilled in the art should appreciate that while Routine 500 provides functionality for dynamically registering objects to be instrumented at run-time, such objects may also be registered with the instrumentation data source when an application utilizing such objects is deployed, or at another time.

The Routine 500 begins at block 502, where an indication is received that an object should be made available to an instrumentation data source. According to one embodiment of the present invention an attribute is provided in the code at development time that indicates that a particular object should be made available to an instrumentation data source. For instance, the attribute "[instrumented]"may be provided in or before a class definition to indicate that the class should be instrumented and made available to an instrumentation data source. Instrumenting objects through attribution provides a very easy way for programmers to expose object data. Previously, a programmer would have to create a complex COM provider to expose instrumentation data. By using attribution, however, a programmer can expose instrumentation data by simply adding the appropriate attribute on the objects to be exposed. In a similar way, instrumentation data may be exposed through a call to a routine exposed by an API for exposing instrumentation data.

According to another embodiment of the present invention, an attribute may be added to shipped code to instrument objects within the code even where the source code is unavailable. In the Microsoft®.NET platform, metadata is emitted when source code is compiled. The metadata is used by the runtime to locate and load class types, lay out object instances in memory, resolve method invocations and field references, translate IL to native code, enforce security, and perform other features. By adding an instrumentation attribute to the metadata for each object to be exposed to the instrumentation data source, these objects may be instrumented without having access to the application source code.

From block 502, the Routine 500 continues to block 504, where a determination is made as to whether a decoupled provider is present. As described briefly above, the decoupled provider facilitates communication between the managed provider executing within the managed code application and the instrumentation data source. If the decoupled provider has not been loaded, the Routine 500 branches to block 506, where the decoupled provider is loaded. The Routine 500 then continues from block 506 to block 508.

If, at block 504, it is determined that the decoupled provider has been loaded, the Routine 500 continues to block 508. At block 508, a determination is made as to whether schema describing the object class to be instrumented has been previously registered with the instrumentation data source. As known to those skilled in the art, such schema describes the properties and methods exposed by and object, much like a class definition. If such schema has been previously registered, the Routine 500 branches to block 510, where a determination is made as to whether the previously registered schema correctly describes the object class. If the previously registered schema correctly describes the object class to be instrumented, the Routine 500 branches to block 520. If the previously registered schema does not correctly describe the object class to be instrumented, the Routine 500 continues from block 510 to block 512, where the previously registered schema is overwritten with schema correctly describing the object class. The Routine 500 then continues from block 512 to block 518.

If, at block 508, it is determined that schema describing the object class to be instrumented has not been registered with the instrumentation data source, the Routine 500 continues to block 514. At block 514, schema describing the object class to be instrumented is registered with the instrumentation data source. According to the actual embodiment of the present invention described herein, this process may comprise creating the schema in the managed object format ("MOF") used by WMI based upon the class definition, or based upon schema describing the class in the XML format used by the Microsoft®.NET platform.

From block 514, the Routine 500 continues to block 516, where the application program associated with the instrumentation data is registered with the instrumentation data source as a provider of instances of such instrumentation data. From block 516, the Routine 500 continues to block 518, where the decoupled provider is also notified that instances of instrumentation data of the object class type are available to be instrumented. The Routine 500 then continues from block 518 to block 520, where it ends.

Figure 6:
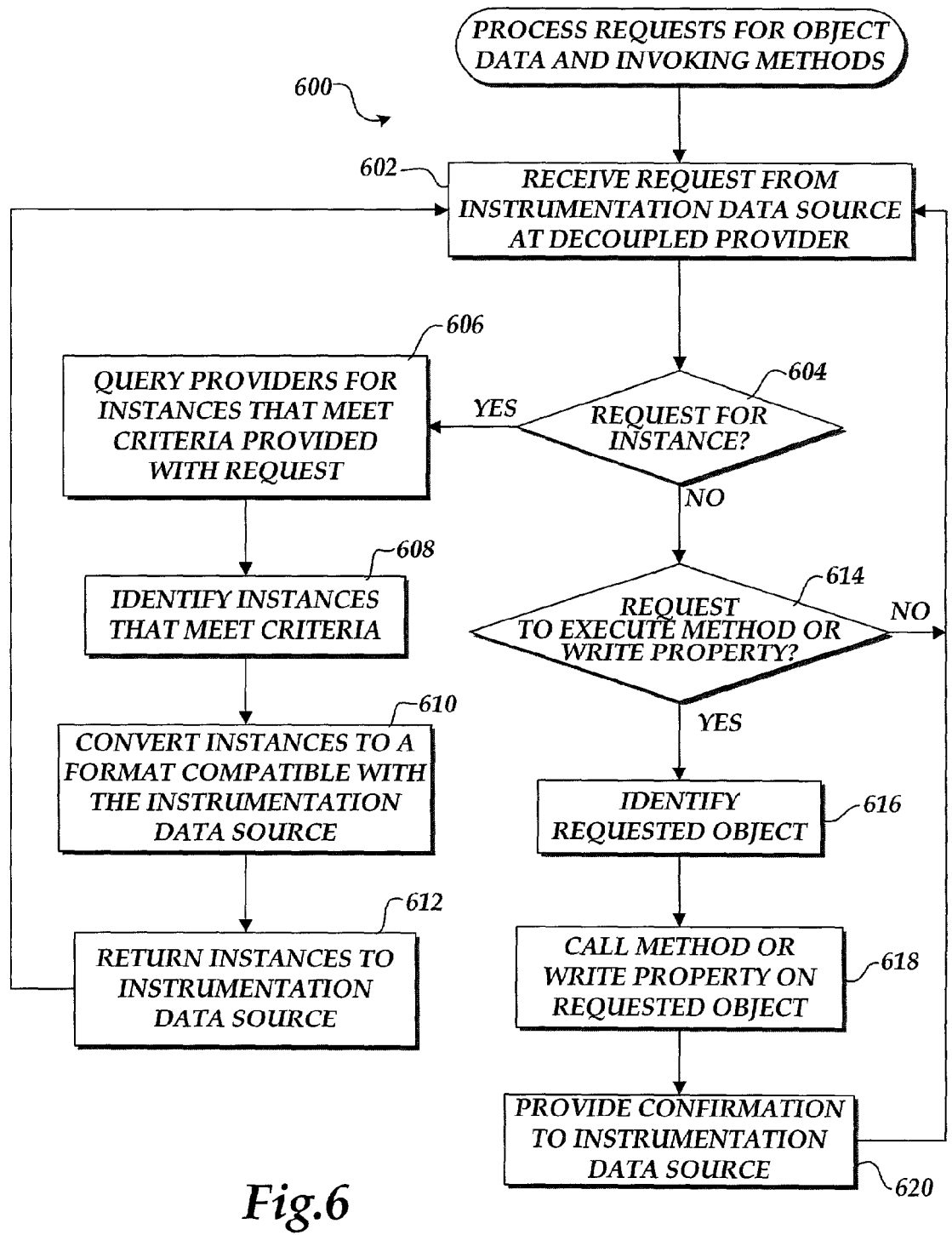
FIG. 6 is a flow diagram showing an illustrative routine for processing requests for object instance data and invoking methods on managed code objects according to an actual embodiment of the present invention.

Referring now to FIG. 6, an illustrative Routine 600 will be described for processing requests for object instance data, for writing properties, and for executing methods on instrumented objects. As described briefly above, once loaded the decoupled provider communicates with the instrumentation data source and responds to requests from the instrumentation data source. For instance, the instrumentation data source may request all instances of an instrumented object, may request to write a property on an instrumented object, or may request to execute a method on an instrumented object. The decoupled provider receives these requests and processes them according to the Routine 600.

The Routine 600 begins at block 602, where a request is received from the instrumentation data source at the decoupled provider. The Routine 600 then continues to block 604, where the decoupled provider determines whether the request received from the instrumentation data source was a request for an instance of an instrumented object. If a request for an instance was received, the Routine 600 branches to block 606 where the decoupled provider queries the managed providers executing within managed code applications for instances that meet the criteria provided with the request. According to one embodiment of the present invention, the decoupled provider queries the available managed providers in a round-robin fashion for matching instances.

From block 606, the Routine 600 continues to block 608, where the instances satisfying the request are identified to the decoupled provider. The Routine 600 then continues to block 610, where the identified instances are converted to a format compatible with the instrumentation data source by the decoupled provider. This process may involve converting instance properties compatible with the managed code environment to properties compatible with the instrumentation data source. The Routine 600 then continues to block 612, where the converted instances are transmitted to the instrumentation data source as a reply to the request. The Routine 600 then returns to block 602, where another request may be processed as described above.

If, at block 604, the decoupled provider determines that the request was not a request for instance data, the Routine 600 continues to block 614. At block 614, the decoupled provider determines whether the request was a request to execute a method on an instance of an instrumented object or to write a property on an instance of an instrumented object. If such a request was not received, the Routine 600 branches from block 614 to block 602, where another request may be processed. If such a request was received, the Routine 600 continues to block 616.

At block 616, the decoupled provider identifies the object upon which the requested action is to be taken. The Routine 600 then continues to block 618, where the decoupled provider executes the requested method or writes the requested property on the identified object. The Routine 600 then continues to block 620, where the decoupled provider provides a confirmation to the instrumentation data source that the requested action has been taken. The Routine 600 then returns to block 602, where another request may be processed in a similar manner.

Figure 7A:
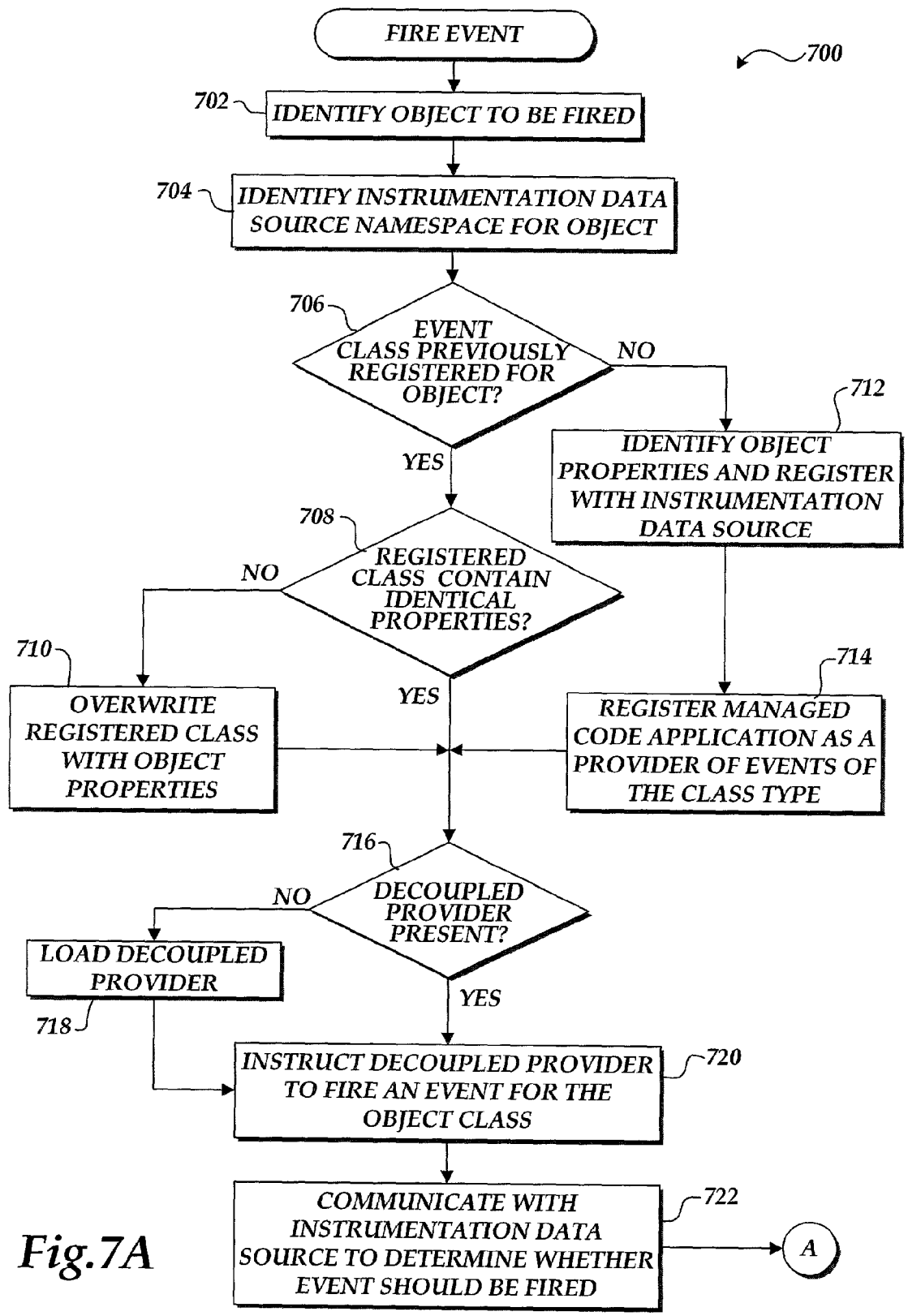
FIG. 7A is a flow diagram showing an illustrative routine for firing events from a managed code environment into an instrumentation data source according to an actual embodiment of the present invention.

Referring now to FIG. 7A, an illustrative Routine 700 for processing requests to fire events regarding instrumented objects from within a managed code environment to an instrumentation data source will be described. As mentioned briefly above, a fire method is exposed within the managed code environment through an API. In order to fire an event into the instrumentation data source, the event object to be fired is first instrumented with an attribute indicating that the object is an event object. The fire method is then called on the object. The object is then fired into the instrumentation data source as described below with regard to the Routine 700.

The Routine 700 begins at block 702 where the object to be fired is identified. The Routine 700 then continues to block 704, where the namespace within the instrumentation data source corresponding to the object to be fired is identified. From block 704, the Routine 700 continues to block 706, where a determination is made as to whether schema describing the object class has previously been registered with the instrumentation data source. If schema has not previously been registered, the Routine continues to block 712, where the object properties are identified and schema is registered with the instrumentation data source for the object. From block 712, the Routine 700 continues to block 714, where the application associated with the event object to be fired is also registered with the instrumentation data source as a provider of such objects. The Routine 700 then continues from block 714 to block 716.

If, at block 706, it is determined that the schema has been previously registered, the Routine 700 branches to block 708. At block 708, a determination is made as to whether the registered schema is correct. If the previously registered schema is correct, the Routine 700 branches to block 716. If the previously registered schema is incorrect, the previously registered schema is overwritten with the new schema at block 710. The Routine 700 then continues from block 710 to block 716. In this manner, schema corresponding to the event class may be dynamically registered with the instrumentation data source.

At block 716, a determination is made as to whether the decoupled provider has previously been loaded. If the decoupled provider has not been previously loaded, the Routine 700 branches from block 716 to block 718 where the decoupled provider is loaded. From block 718, the Routine 700 continues to block 720.

If, at block 716, it is determined that the decoupled provider has been previously loaded, the Routine 700 continues to block 720, where the decoupled provider is instructed to fire an event for the identified object class. The Routine 700 then continues to block 722, where the decoupled provider communicates to the instrumentation data source to determine whether the event should be fired. This may include querying the instrumentation data source to determine if any client applications are listening for events of the type to be fired.

Figure 7B:
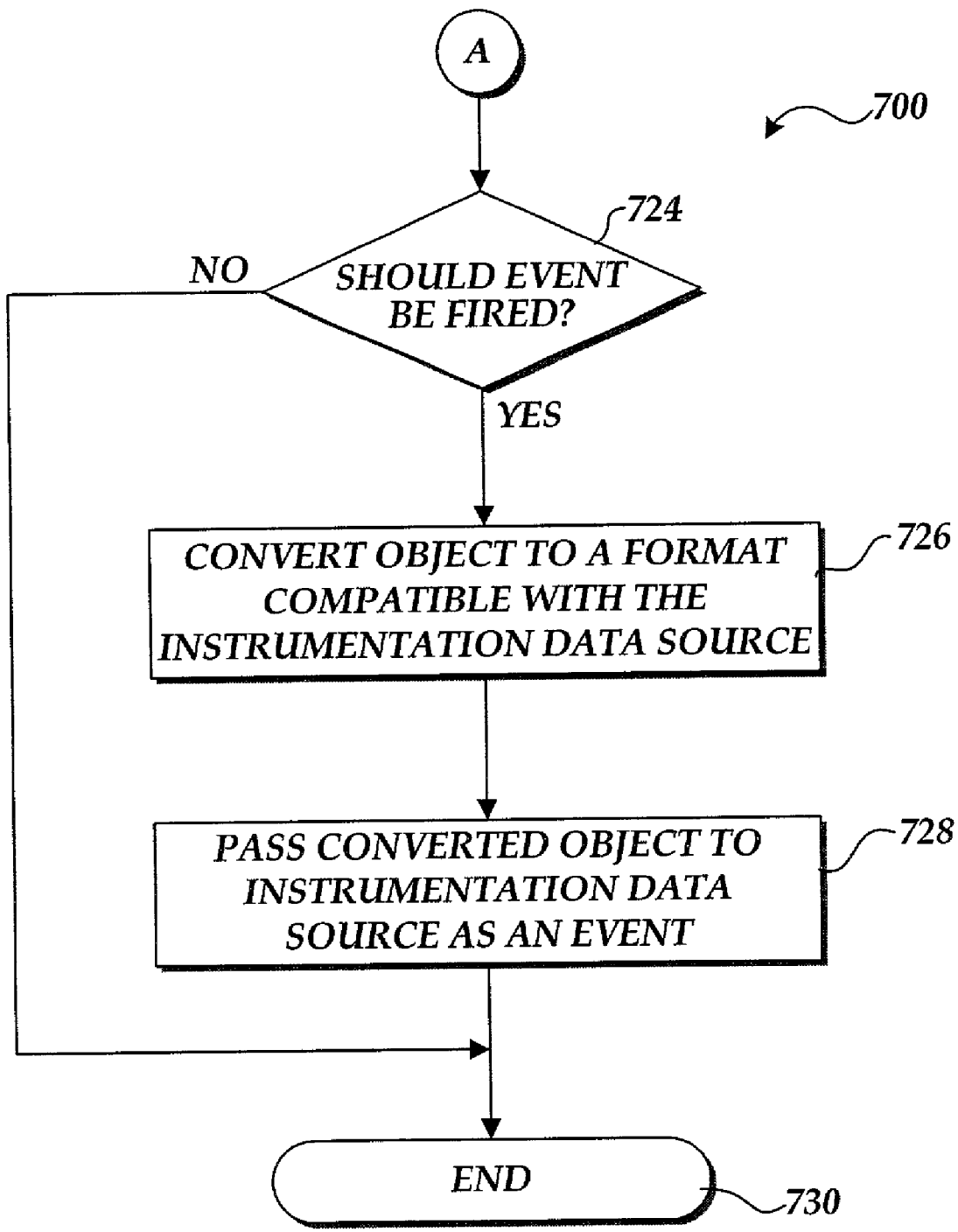
FIG. 7B is a flow diagram showing an illustrative routine for firing events from a managed code environment into an instrumentation data source according to an actual embodiment of the present invention.

The Routine 700 then continues to block 724 (shown in FIG. 7B), where a determination is made as to whether the event should be fired. If the event should not be fired, the Routine 700 branches to block 730, where it ends. In this manner, the event will not be fired if no client is listening for the event thereby saving message bandwidth. If, at block 724, it is determined that the event should be fired, the Routine 700 continues to block 724 to block 726, where the object is converted from a format compatible with the managed code environment to a format compatible with the instrumentation data source. The Routine then continues to block 728, where the converted event object is fired into the instrumentation data source. The Routine 700 then continues to block 730, where it ends.

In light of the above, it should be appreciated by those skilled in the art that the present invention provides a method and apparatus for providing instrumentation data available within a managed code environment to an external instrumentation data source. While an actual embodiment of the invention has been illustrated and described, it will be appreciated that various changes can be made therein without departing from the spirit and scope of the invention.

What is claimed is:

1. A method for exposing instrumentation data available within a managed code environment to an instrumentation data source executing outside said managed code environment, comprising:

receiving an indication that said instrumentation data should be exposed to said instrumentation data source;

in response to receiving said indication, loading a decoupled provider for facilitating communication between said managed code environment and said instrumentation data source;

determining whether schema describing said instrumentation data has been previously registered with said instrumentation data source;

in response to determining that said schema has not been previously registered with said instrumentation data source, registering said schema with said instrumentation data source through said decoupled provider;

in response to determining that said schema has previously been registered with said instrumentation data source, determining whether said previously registered schema is correct; and in response to determining that said previously registered schema is incorrect, overwriting said previously registered schema with said schema describing said instrumentation data.

2. The method of claim 1, further comprising:

registering an application program associated with said instrumentation data with said instrumentation data source as a provider of instances of said instrumentation data.

3. The method of claim 2, further comprising:

notifying said decoupled provider that said instrumentation data is available.

4. The method of claim 3, wherein said instrumentation data comprises an object and wherein said schema describes the properties and methods exposed by said object.

5. The method of claim 4, wherein said indication that said instrumentation data should be exposed to said instrumentation data source comprises an attribute.

6. The method of claim 4, wherein said indication that said instrumentation data should be exposed to said instrumentation data source comprises a call to an application programming interface.

7. A computer-readable medium comprising instructions which, when executed by a computer, cause the computer to perform the method recited in any one of claims 1–6.

8. A computer-controlled apparatus capable of performing the method recited in any one of claims 1–6.

9. A method for exposing instrumentation data available within a managed code environment to an instrumentation data source executing outside said managed code environment, comprising:

receiving an indication that said instrumentation data should be exposed to said instrumentation data source;

in response to receiving said indication, loading a decoupled provider for facilitating communication between said managed code environment and said instrumentation data source;

determining whether schema describing said instrumentation data has been previously registered with said instrumentation data source;

in response to determining that schema has not been previously registered with said instrumentation data source, registering said schema with said instrumentation data source through said decoupled provider;

in response to determining that said schema has previously been registered with said instrumentation data source, determining whether said previously registered schema is correct;

in response to determining that said previously registered schema is incorrect, overwriting said previously registered schema with said schema describing said instrumentation data;

receiving a request for said instrumentation data from said instrumentation data source at said decoupled proxy; and in response to said request, converting said instrumentation data from a format compatible with said managed code environment to a format compatible with said instrumentation data source, and transmitting said converted instrumentation data to said instrumentation data source.

10. The method of claim 9, wherein said instrumentation data comprises an object and wherein said schema describes the properties and methods exposed by said object.

11. The method of claim 10, wherein said request for said instrumentation data comprises a request for instances of said object.

12. The method of claim 11, wherein said request for said instrumentation data is received at said decoupled provider, and further comprising:

querying one or more providers for instances satisfying said request.

13. The method of claim 12, wherein said one or more providers are queried by said decoupled provider in a round-robin fashion to identify instances satisfying said request.

14. The method of claim 13, wherein said indication that said instrumentation data should be exposed to said instrumentation data source comprises an attribute.

15. The method of claim 13, wherein said indication that said instrumentation data should be exposed to said instrumentation data source comprises a call to an application programming interface.

16. A computer-readable medium comprising instructions which, when executed by a computer, cause the computer to perform the method recited in any one of claims 9–15.

17. A computer-controlled apparatus capable of performing the method recited in any one of claims 9–15.

18. A method for exposing instrumentation data available within a managed code environment to an instrumentation data source executing outside said managed code environment, comprising:

receiving a request for said instrumentation data at a decoupled provider;

determining whether said request comprises a request for one or more instances of said instrumentation data;

in response to determining that said request comprises a request for instances, querying one or more providers from said decoupled provider to determine if instances of said instrumentation data are available;

in response to determining that said instances of said instrumentation data are available that satisfying said request, converting said instances of said instrumentation data satisfying said request from a format compatible with said managed code environment to a format compatible with said instrumentation data source, and transmitting said converted instances of said instrumentation data satisfying said request to said instrumentation data source;

determining whether said request comprises a request to execute a method on an instance of said instrumentation data;

in response to determining that said request comprises a request to execute a method, identifying said instance of said instrumentation data and executing said method on said instance; and providing a confirmation from said decoupled provider to said instrumentation data source that said method was executed.

19. The method of claim 18 wherein said providers are queried by said decoupled provider in a round-robin fashion to determine if instances of said instrumentation data are available that satisfy said request.

20. The method of claim 18, further comprising:
  determining whether said request comprises a request to write a property on an instance of said instrumentation data;
  in response to determining that said request comprises a request to write a property, identifying said instance of said instrumentation data and writing said property on said instance; and
  providing a confirmation from said decoupled provider to said instrumentation data source that said property was written.

21. A computer-readable medium comprising instructions which, when executed by a computer, cause the computer to perform the method recited in any one of claims 18–20.

22. A computer-controlled apparatus capable of performing the method recited in any one of claims 18–20.

23. A method for exposing instrumentation data available within a managed code environment to an instrumentation data source executing outside said managed code environment, comprising:
  receiving a request to fire an event relating to said instrumentation data into said instrumentation data source;
  in response to receiving said request, loading a decoupled provider for facilitating communication between said managed code environment and said instrumentation data source;
  determining whether schema describing said instrumentation data has been previously registered with said instrumentation data source;
  in response to determining that schema has not been previously registered with said instrumentation data source, registering said schema with said instrumentation data source through said decoupled provider;
  in response to determining that said schema has previously been registered with said instrumentation data source, determining whether said previously registered schema is correct;
  in response to determining that said previously registered schema is incorrect, overwriting said previously registered schema with said schema describing said instrumentation data;
  determining at said decoupled provider whether said event should be fired; and
  in response to determining that said event should be fired, converting said instrumentation data from a format compatible with said managed code environment to a format compatible with said instrumentation data source, and firing said converted instrumentation data from said decoupled provider to said instrumentation data source as an event.

24. The method of claim 23, wherein said request to fire an event comprises a call to an application programming interface.

25. The method of claim 24, wherein said instrumentation data comprises an attribute indicating that said instrumentation data may be exposed to said instrumentation data source as an event.

26. The method of claim 25, further comprising:
  in response to determining that said schema has previously been registered with said instrumentation data source, determining whether said previously registered schema is correct; and
  in response to determining that said previously registered schema is incorrect, overwriting said previously registered schema with said schema describing said instrumentation data.

27. The method of claim 26, wherein determining at said decoupled provider whether said event should be fired comprises determining whether said instrumentation data satisfies parameters provided with said request.

28. A computer-readable medium comprising instructions which, when executed by a computer, cause the computer to perform the method recited in any one of claims 23–27.

29. A computer-controlled apparatus capable of performing the method recited in any one of claims 23–27.

30. A method for exposing the instrumentation data of a managed code application to an instrumentation data source, the method comprising:
  receiving an indication that the instrumentation data of the managed code application should be exposed to an instrumentation data source, wherein the managed code application is executing in a managed code environment and wherein the instrumentation data source is concurrently executing outside of the managed code environment;
  in response to receiving the indication, loading a decoupled provider component in the managed code environment, the decoupled provider being configured to facilitate communication between the managed code application and the information data source;
  determining whether a schema corresponding to the instrumentation data of the managed code application has been previously registered with the instrumentation data source;
  in response to determining that the schema has not been previously registered with the instrumentation data source, registering the schema of the managed code application with the instrumentation data source via the decoupled provider;
  in response to determining that said schema has previously been registered with said instrumentation data source, determining whether said previously registered schema is correct; and
  in response to determining that said previously registered schema is incorrect, overwriting said previously registered schema with said schema describing said instrumentation data.

31. The method of claim 30, wherein the managed code environment is Microsoft's .NET framework.

32. The method of claim 31, wherein the instrumentation data source is a Windows Management Instrumentation (WMI) service.

33. The method of claim 30, wherein the managed code environment is a virtual machine.

* * * * *